United States Patent
Povlick et al.

(10) Patent No.: US 9,332,179 B2
(45) Date of Patent: May 3, 2016

(54) FLASH COLLISION DETECTION, COMPENSATION, AND PREVENTION

(71) Applicant: QUALCOMM Incorporated, San Diego, CA (US)

(72) Inventors: Timothy Robert Povlick, San Diego, CA (US); Szepo Robert Hung, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 14/319,846

(22) Filed: Jun. 30, 2014

(65) Prior Publication Data

US 2015/0381890 A1    Dec. 31, 2015

(51) Int. Cl.
*H04N 5/232* (2006.01)
*H04N 5/359* (2011.01)
*H04N 5/235* (2006.01)

(52) U.S. Cl.
CPC ......... *H04N 5/23229* (2013.01); *H04N 5/2354* (2013.01); *H04N 5/23222* (2013.01); *H04N 5/359* (2013.01)

(58) Field of Classification Search
CPC ...... H04N 5/2354; H04N 9/735; H04N 5/361
USPC ....................... 348/224.1, 371, 241
See application file for complete search history.

(56) References Cited

U.S. PATENT DOCUMENTS

| | | | |
|---|---|---|---|
| 7,697,837 B2 | 4/2010 | Kosaka | |
| 7,995,911 B2 | 8/2011 | Butterworth | |
| 8,306,412 B2 | 11/2012 | Drader et al. | |
| 8,463,119 B2 | 6/2013 | Kubota | |
| 8,571,400 B2 | 10/2013 | King et al. | |
| 9,001,226 B1 | 4/2015 | Ng et al. | |
| 2003/0133018 A1 | 7/2003 | Ziemkowski | |
| 2006/0018653 A1 | 1/2006 | Kido | |
| 2006/0034602 A1 | 2/2006 | Fukui | |
| 2006/0133648 A1 | 6/2006 | Meunier et al. | |
| 2007/0013807 A1 | 1/2007 | Kanai et al. | |
| 2008/0062009 A1 | 3/2008 | Marton | |
| 2008/0298792 A1 | 12/2008 | Clark | |
| 2011/0001849 A1 | 1/2011 | Wada et al. | |
| 2011/0001859 A1 | 1/2011 | Matsuura et al. | |
| 2011/0115941 A1* | 5/2011 | Kim ..................... | H04N 5/2256 348/223.1 |

(Continued)

OTHER PUBLICATIONS

Partial International Search Report—PCT/US2015/035330—ISA/EPO—Sep. 28, 2015.

(Continued)

*Primary Examiner* — Roberto Velez
*Assistant Examiner* — Cynthia Segura
(74) *Attorney, Agent, or Firm* — Knobbe, Martens, Olson & Bear LLP

(57) ABSTRACT

Certain aspects relate to systems and techniques for flash collision detection, compensation, and prevention. For example, the flash of another camera or other sudden increases in ambient lighting of an image scene can introduce unwanted quality degradations into captured images, for example over-exposure of part or all of the captured image. Flash collision can be detected through a row sum calculation and comparison process in some examples. In some examples, flash collision can be compensated for by analysis of row sum data from a number of preview frames. In other examples, flash collision can be mitigated or prevented through use of a flash traffic control protocol.

27 Claims, 9 Drawing Sheets

(56) References Cited

U.S. PATENT DOCUMENTS

| | | | | |
|---|---|---|---|---|
| 2011/0255786 A1* | 10/2011 | Hunter | ................ | H04N 5/2357 382/190 |
| 2012/0026358 A1* | 2/2012 | Hirose | .................... | G02B 7/28 348/226.1 |
| 2012/0026359 A1* | 2/2012 | Fukushima | .......... | H04N 5/2354 348/226.1 |
| 2013/0120636 A1 | 5/2013 | Baer | | |
| 2014/0028435 A1 | 1/2014 | Brockway, III et al. | | |
| 2014/0078358 A1* | 3/2014 | Takenaka | ............. | H04N 5/2353 348/294 |
| 2015/0381868 A1 | 12/2015 | Povlick | | |

OTHER PUBLICATIONS

International Search Report and Written Opinion—PCT/US2015/035330—ISA/EPO—Dec. 7, 2015.

* cited by examiner

FLASH COLLISION DETECTION, COMPENSATION, AND PREVENTION

CROSS-REFERENCE TO RELATED APPLICATIONS

The present application is related to U.S. patent application Ser. No. 14/319,670, filed on Jun. 30, 2014, entitled "FLASH COLLISION DETECTION, COMPENSATION, AND PREVENTION," the contents of which is hereby incorporated by reference herein in its entirety and for all purposes.

TECHNICAL FIELD

The systems and methods disclosed herein are directed to image capture devices and techniques, and, more particularly, to systems and techniques for avoiding extraneous flash effects on captured images.

BACKGROUND

Due to the prevalence of personal cameras, e.g. portable digital cameras and cell phone cameras, several people may capture different images of a scene at around the same time. For example, several people may capture different images at the same moment, including at a birthday party when a child is blowing out candles on a birthday cake, at a wedding during memorable moments, or in other scenarios. In such scenarios where multiple cameras are in action, the flash or preflash from one camera can introduce unwanted quality degradations into an image captured by another camera. The quality degradations can be due, in some examples, to the rolling shutter of CMOS sensors, by which each row of the resulting image is exposed at slightly different times. Accordingly, if the flash or preflash from another camera goes off during exposure of a frame, any subsequently exposed rows of the resulting image may be undesirably overexposed.

SUMMARY

In general, this disclosure is related to systems and techniques for flash influence detection and compensation. In some embodiments, row summation logic can be provided to detect the influence of extraneous camera flashes on captured image data (referred to herein as "flash collision") including a number of frames captured of an image scene at a high enough frame rate that the frames are substantially similar, for example at around 30 frames per second (fps). The row summation logic, for example, can add pixel values for each row of each frame to form a resulting summed row value. A flash influence detection system can compare summed row values between frames on a row-by-row basis to determine whether flash collision has occurred during capture of a frame. If some or all rows of a frame are influenced by extraneous flash, then the summed values of those rows of the frame can be higher than the summed values of the corresponding rows of a previous frame not influenced by the extraneous flash. If no flash collision is detected, then the flash influence compensation technique can instruct the camera to capture an image at user-requested timing. If flash collision is detected in one or more frames, then the flash influence compensation technique can either instruct the camera to capture a new frame of the image scene or can select a previously captured frame that is not influenced by extraneous flash to output to the user.

In another embodiment, a flash traffic control protocol (also referred to as a "flash traffic controller") can assign time slots to networked cameras based on image capture requests and whether the cameras intend to use flash during image capture. For example, a camera can request a time slot when the camera user activates a shutter button, and can inform the flash traffic control protocol whether the image will be captured using flash. Based on available time slots and flash usage, the flash traffic control protocol can assign requesting cameras to time slots in an organized manner to prevent flash collision among the networked cameras.

Accordingly, one aspect relates to a system for flash collision detection and compensation, the system comprising an image sensor configured to capture a plurality of image frames depicting an image scene, each of the plurality of image frames including a plurality of pixels arranged in a plurality of rows; a frame analyzer including row sum logic configured to, for a first row of the plurality of rows in a current frame of the plurality of image frames, calculate a first row sum value based at least partly on a value of each of the plurality of pixels in the first row, for a second row of the plurality of rows in a previous frame of the plurality of image frames, calculate a second row sum value based at least partly on a value of each of the plurality of pixels in the second row, the first row and the second row depicting a substantially similar portion of the image scene, calculate a row sum difference based at least partly on the first row sum value and the second row sum value, and output one of a flash collision detected indication or a flash collision not detected indication based at least partly on the row sum difference.

Another aspect relates to a method for flash collision detection and compensation, the method comprising receiving a plurality of image frames depicting an image scene, each of the plurality of image frames including a plurality of pixels arranged in a plurality of rows; for a first row of the plurality of rows in a current frame of the plurality of image frames, calculating a first row sum value based at least partly on a value of each of the plurality of pixels in the first row; for a second row of the plurality of rows in a previous frame of the plurality of image frames, calculating a second row sum value based at least partly on a value of each of the plurality of pixels in the second row, the first row and the second row depicting a substantially similar portion of the image scene; calculating a row sum difference based at least partly on the first row sum value and the second row sum value; and outputting one of a flash collision detected indication or a flash collision not detected indication based at least partly on the row sum difference.

Another aspect relates to non-transitory computer-readable medium storing instructions that, when executed, configure at least one processor to perform operations comprising receiving a plurality of image frames depicting an image scene, each of the plurality of image frames including a plurality of pixels arranged in a plurality of rows; for a first row of the plurality of rows in a current frame of the plurality of image frames, calculating a first row sum value based at least partly on a value of at least some of the plurality of pixels in the first row; for a second row of the plurality of rows in a previous frame of the plurality of image frames, calculating a second row sum value based at least partly on a value of at least some of the plurality of pixels in the second row, the first row and the second row depicting a substantially similar portion of the image scene and forming a pair of corresponding rows; calculating a row sum difference based at least partly on the first row sum value and the second row sum value; and outputting one of a flash collision detected indication or a flash collision not detected indication based at least partly on the row sum difference.

Another aspect relates to a flash collision detection and compensation apparatus comprising means for receiving a plurality of preview frames depicting an image scene, the plurality of preview frames; means for determining whether a flash collision has occurred in any of the plurality of image frames; means for generating instructions to continue capture of additional preview frames depicting the image scene based on a determination that the flash collision has occurred; and means for generating instructions to capture a final image based on a determination that the flash collision has not occurred.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Figure 1B:
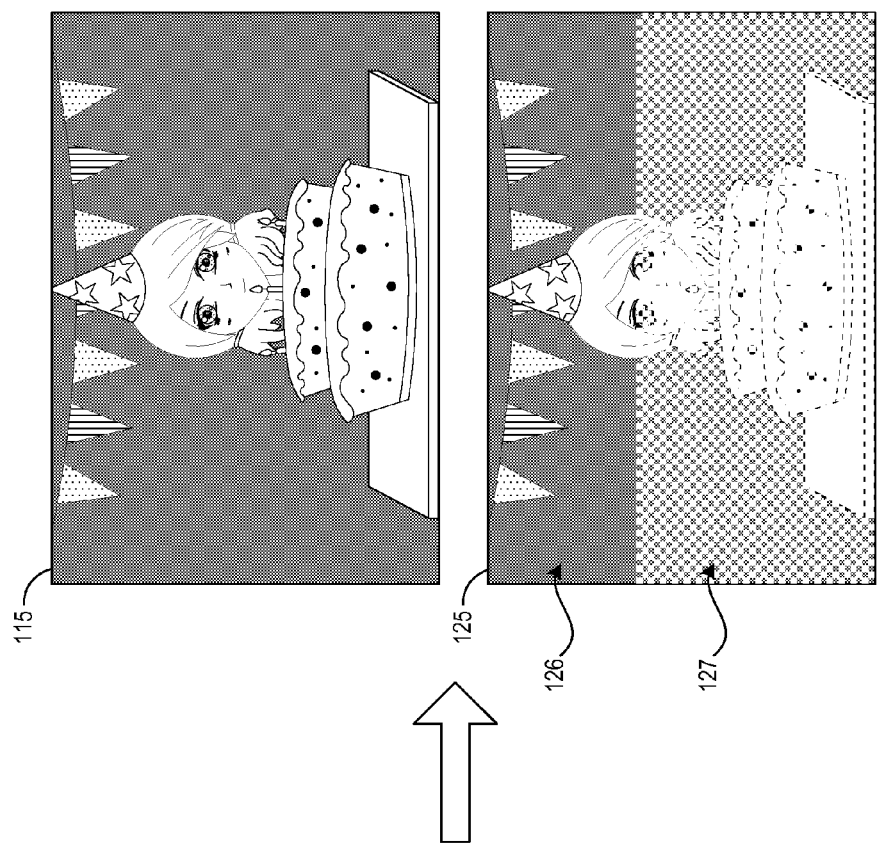
FIGS. 1A and 1B illustrate a graphical overview of one embodiment of an image capture process and resulting captured images involving flash collision.

Embodiments of the disclosure relate to systems and techniques for flash influence detection and compensation. One technique for compensating for the quality degradation introduced to captured images by the flash of another camera includes comparing a number of image frames captured in close succession in order to determine whether flash influence is detected.

For example, in one implementation, row summation logic can be provided to detect the influence of extraneous camera flashes on captured image data. The camera can be configured to capture a number of frames of an image scene at a high enough frame rate that the frames are substantially similar, for example at around 30 frames per second (fps). Row summation logic can sum pixel values for each row of each frame. For instance, the camera image signal processor (ISP) can output statistics for auto white balance (AWB) data and auto exposure control (AEC) data for each frame. In various implementations, the row summation logic can sum at least one component of the AWB data and the AEC data, for example R/G (red normalized by green), B/G (blue normalized by green), or Y (luma/brightness) values.

The flash influence detection technique can compare summed row values between frames on a row-by-row basis to determine whether another camera's flash has influenced a frame. To illustrate, if no extraneous flash has influenced the image data, the summed row values between frames should be substantially similar. However, if, for example, the last four rows of a second frame are influenced by extraneous flash, then the summed values of the last four rows of the second frame can be higher than the summed values of the last four rows of a first frame not influenced by the extraneous flash. The flash-influenced rows can have values of around 4 stops brighter than the corresponding rows on an uninfluenced frame, where "stop" refers to the measure of brightness commonly used in imaging. The threshold for determining whether extraneous flash has influenced image data can be user-set or dynamically controlled by machine learning instructions incorporated into the flash influence detection technique, and can be set to ¼ stop, ½ stop, or 1 stop in various implementations.

If no extraneous flash influence is detected, then the flash influence compensation technique can instruct the camera to capture an image at user-requested timing. If extraneous flash influence is detected in one or more frames, then the flash influence compensation technique can either instruct the camera to capture a new frame of the image scene or can select a previously captured frame that is not influenced by extraneous flash to output to the user. Accordingly, the captured image will be of substantially the same moment as the user-requested timing, in contrast to the scenario where the user visually reviews the captured image and decides to retake the image due to flash corruption, by which time the picturesque moment may have passed.

Some embodiments can reduce or eliminate quality degradation of captured images due to extraneous flash influence by providing flash traffic control systems and techniques. For example, in one implementation, user cameras can be configured, either at user discretion or based on proximity, to form, join or communicate with local networks, for example, by Bluetooth or WiFi. Cameras forming a local network can be controlled by a flash traffic control protocol which allots "time slots" for image capture to the cameras on the network. For example, a camera can request a time slot when the camera user activates a shutter button, and can inform the flash traffic control protocol whether the image will be captured using flash.

If the current time slot is not taken, the traffic control protocol can reserve this time slot for the requesting camera. If the current time slot is occupied by another camera that is not using flash, then the requesting camera can also join the current time slot and capture an image. In this scenario, the requesting camera may be prevented from using flash in order to avoid influencing the image captured by the other camera in the time slot. As such, if the time slot request includes an indication that flash is enabled, the requesting camera may be placed into a next available time slot in a queue.

If the current time slot is occupied by another camera that is using flash, then the requesting camera can be placed into a next available time slot in a queue. In some implementations, if the requesting camera requests the current time slot with flash enabled and the other camera has not yet begun image capture, the rolling shutters of the requesting camera and the other camera can be synchronized and the requesting camera can join the current time slot.

Overview of Example Flash Collision Detection and Compensation

Figure 1A:
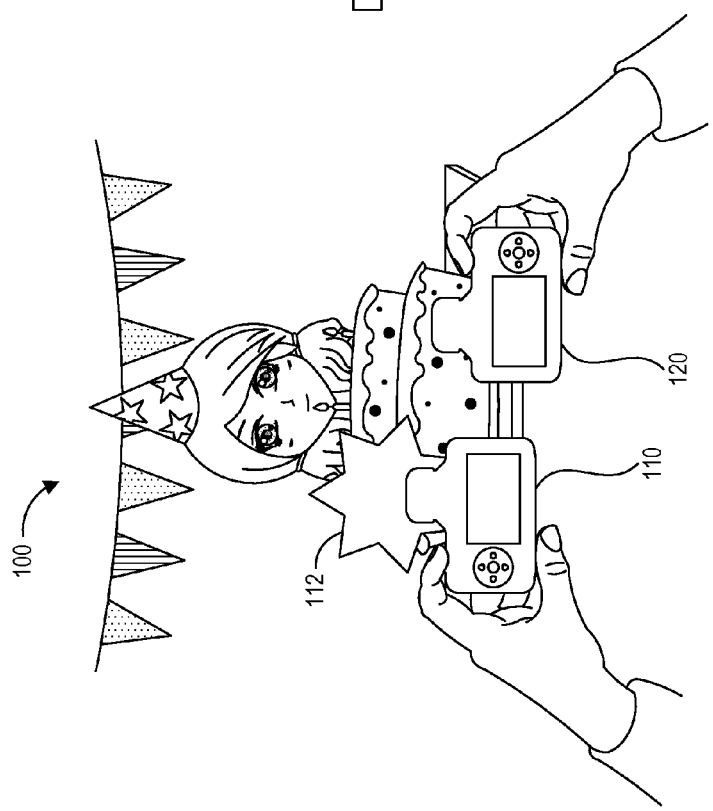

FIGS. 1A and 1B illustrate a graphical overview of one embodiment of an image capture process 100 and resulting captured images 115, 125 involving flash collision. Although two cameras are illustrated with one camera using flash, this is for purposes of explanation and the flash collision detection and compensation processes described herein can be used in scenarios involving three or more cameras and scenarios in which more than one camera uses flash during image capture.

FIG. 1A illustrates an example target image scene 100 of which multiple camera users are capturing images. A user of a first camera 110 captures an image 115 using flash 112, while a user of a second camera 120 captures an image 125 at least partly during the duration of the flash 112. FIG. 1B illustrates and example of the corresponding captured images 115, 125.

The image 115 captured by the camera 110 using flash 112 is properly exposed, as the camera 110 (or possibly the user in a manual operation mode) calibrated image capture settings based on using the flash 112 to illuminate the image scene 100. In photography, exposure is the amount of light per unit area (the image plane illuminance times the exposure time) reaching the image sensor, as determined by shutter speed, lens aperture and scene luminance. Typically, digital cameras are capable of implementing automatic exposure ("AE") control techniques to determine shutter speed lens aperture based on an analysis of the scene luminance. For example, a camera in AE mode may automatically calculate and adjust exposure settings for example aperture and shutter speed to match (as closely as possible) the mid-tone of the target image scene to the mid-tone of the photograph.

However, the image 125 captured by the other camera 120 includes a properly exposed portion 126 and an over-exposed portion 127 due to the flash collision produced by capturing the image at least partially during the flash 112 of the other camera. This phenomenon is commonly referred to as "partial exposure" or a "split-frame exposure," resulting from capture of the image 125 using a rolling shutter. Rolling shutter is a method of image acquisition in which a captured is recorded not from a snapshot of a single point in time, but rather by scanning across the frame either vertically or horizontally. In the illustrated example, the rolling shutter scanned rows of sensor photodiodes corresponding to the rows of pixels in the properly exposed portion 126 of the captured image 125 before flash 112 began and scanned rows of sensor photodiodes corresponding to the rows of pixels in the over-exposed portion 127 of the captured image 125 after flash 112 began. Because flash 112 was not illuminating the image scene 100 when the camera 120 (or user of the camera 120) initially calibrated the exposure settings, the increase of light caused by the flash caused over-exposure of the portion 127. Typically, complementary metal-oxide-semiconductor (CMOS) sensors that are commonly used in digital cameras and mobile device cameras implement rolling shutter.

Although the depicted example shows an example of the quality degradation that can be introduced by flash collision to an image captured by a camera implementing a rolling shutter, images captured by cameras implementing global shutters can also suffer from quality degradations due to flash collisions. For example, if a flash collision occurs after an image capture system with a global shutter determines exposure settings for image capture but before the image is capture, this can result in over-exposure of the entire image or light bleed across a portion of the captured image.

Further, although "flash collision" as discussed herein typically refers to the influence of another camera's flash on a captured image, other scenarios can result in flash collision as well. For example, lighting, strobing light, muzzle flashes from weapon fire, or other abrupt and/or large increases in the amount of ambient light of an image scene can produce similar over-exposure quality degradations in captured images as those produced by an external camera's flash. In addition, although flash collisions are often discussed herein as occurring during image capture and causing over-exposure of some or all of a captured image, in some embodiments a flash collision can occur during calibration of AE settings and conclude prior to image capture, causing under-exposure of some or all of a captured image.

Figure 2:
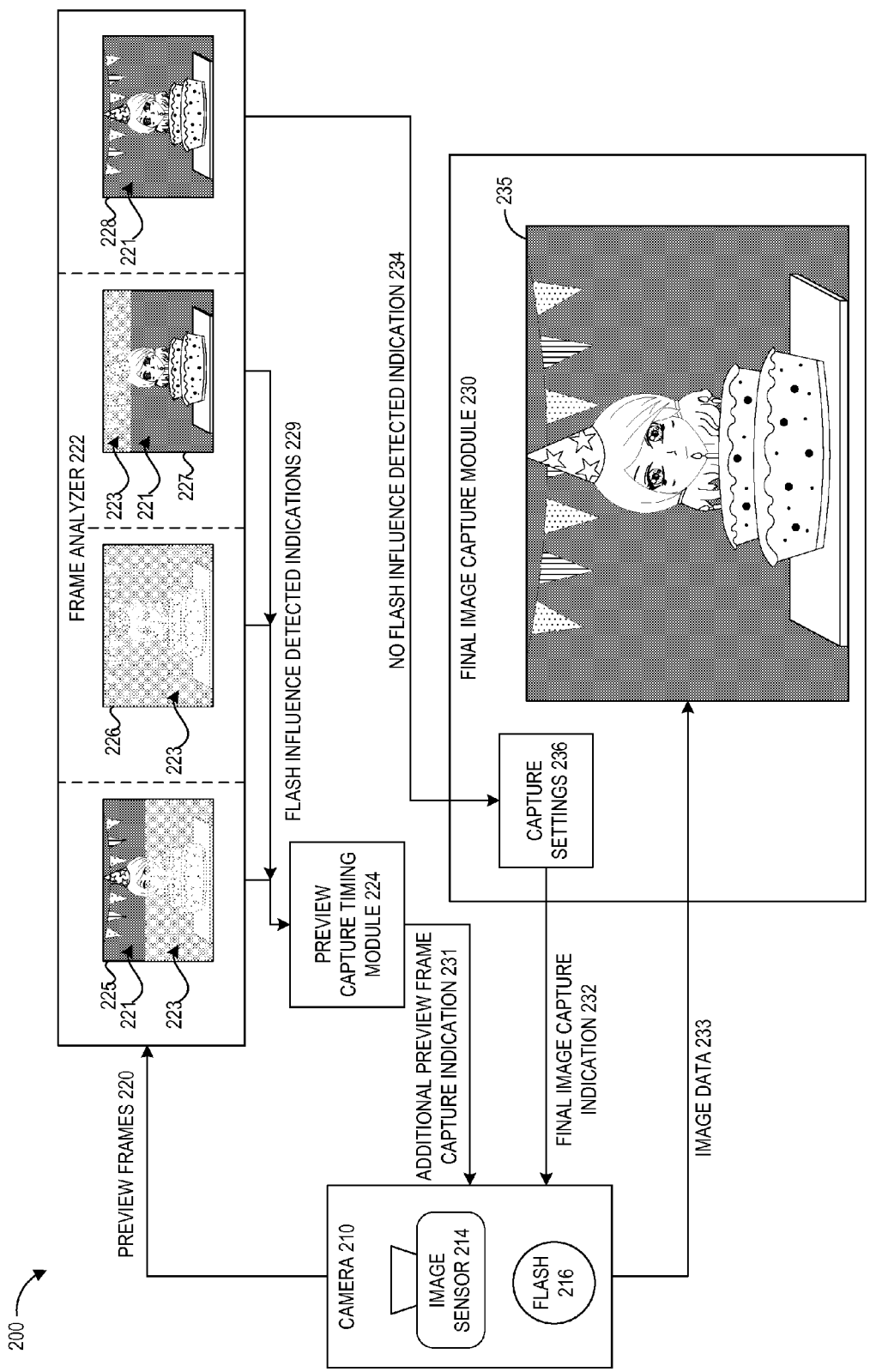
FIG. 2 illustrates a high-level graphical overview and schematic diagram of one embodiment of a flash collision detection and compensation system.

FIG. 2 illustrates a high-level graphical overview and schematic diagram of one embodiment of a flash collision detection and compensation system 200 including a camera 210, frame analyzer 222, preview capture timing module 224, and final image capture module 230.

The camera 210 can include an image sensor 214 and a flash module 216. The camera 210 can be configured to capture preview frames of an image scene, for example for display on a view finder of a device including the flash collision detection and compensation system 200. Such preview frames may be used to present a "live" preview of the image scene as captured by the system 200 to a user, and may be downsized or lower-resolution relative to a final captured image. In some embodiments, preview frames can be captured continuously or near-continuously while the system 200 or the device including the system 200 is in an image capture mode. A number of preview frames can be stored in a buffer or other memory for a predetermined period of time before being replaced by new preview frames. In some embodiments, image capture settings including AE settings may be determined based on an analysis of one or more preview frames. The camera 210 can also be configured to capture a full resolution final image using the determined image capture settings.

Preview frames 220 can be sent to frame analyzer 222 for determining whether a flash collision has occurred and caused quality degradation in captured image data. For example, when a user activates a shutter button or otherwise provides an image capture command, the camera 210 can begin providing captured preview frames 220 to the frame analyzer 222. Although not illustrated, in some embodiments one or more stored preview frames can be retrieved from a buffer or memory.

Frame analyzer 222 can analyze each of a number of preview frames 225, 226, 227, and 228 to determine whether flash collision has occurred. For example, as will be discussed in more detail below, frame analyzer 222 can perform a row sum data comparison to detect flash collisions. The frame analyzer 222 can compute row sum data (for instance based on one or both of white balance and exposure control data) for a currently analyzed frame and a previous frame, compute a difference between corresponding row sums of the currently analyzed frame and the previous frame, and compare each difference to a threshold. If no flash collision has occurred, the corresponding row sum values should be approximately the same. However, if the difference between corresponding row sum values exceeds the threshold, then flash collision may have occurred to cause over-exposure of at least a portion of the currently analyzed frame.

To illustrate, for preview frame 225, the row sum data comparison can enable frame analyzer 222 to detect a properly exposed region 221 and an over-exposed region 223, indicating that the flash collision occurred partway through capture of preview frame 225 using a rolling shutter. For preview frame 226, the row sum data comparison can enable frame analyzer 222 to detect that the entire frame 226 consists of an over-exposed region 223, indicating that the flash collision continued throughout the capture of preview frame 226. For preview frame 227, the row sum data comparison can enable frame analyzer 222 to detect an over-exposed region 223 and a properly exposed region 221, indicating that the flash collision ended partway through capture of preview frame 225 using a rolling shutter. For each of these preview frames, frame analyzer 222 can output a flash influence detected indication 229 to the preview capture timing module 224. Preview capture timing module 224 can configure the camera 210 to continue capturing preview frames based on receiving the flash influence detected indications 229.

For preview frame 228, the row sum data comparison can enable frame analyzer 222 to detect that the entire frame 228 consists of a properly exposed region 221, indicating that no flash collision is detected for the currently analyzed preview frame 228. Accordingly, frame analyzer 222 can output a no flash influence detected indication 234 to final image capture module 230. For example, the no flash influence detected indication 234 can be received at a capture settings module 236 of the final image capture module 230. Capture settings module 236 can analyze preview frame 228 in some embodiments to determine image capture settings for example AE settings and the like, as well as any needed post-processing settings such white balance, color balance, lens correction, and the like.

Capture settings module 236 can output final image capture indication 232 to configure the camera 210 for capture of a final image using the determined settings. Camera 210 can output image data 233 to the final image capture module 230 for use in generating the final image 235, for example by applying any determined post-processing settings to image data 233, the final image 235 being free of flash collision artifacts.

Figure 3A:
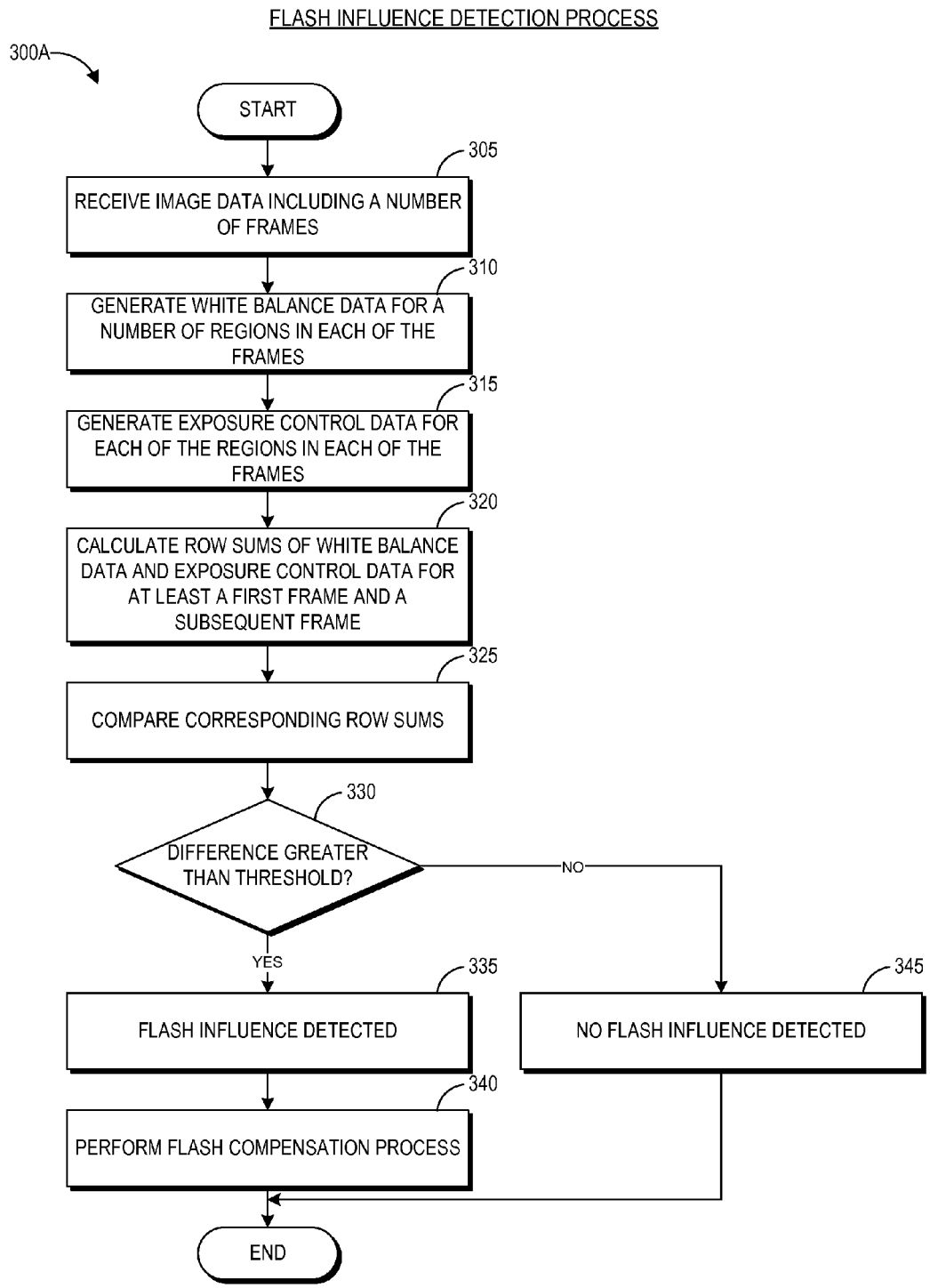
FIG. 3A illustrates a flowchart of an embodiment of a flash collision detection process.

FIG. 3A illustrates a flowchart of an embodiment of a flash collision detection process 300A. The process 300A can be implemented by the flash collision detection and compensation system 200 in some embodiments, or by any image capture and/or processing system having flash collision detection capabilities.

At block 305, the system 200 can receive image data including a number of frames. For example, as discussed above, a number of preview or viewfinder frames can be generated to display a "live" preview of the image data captured by the system 200 to a user. Such frames can be received at a frame analyzer 222 directly from a camera or from storage.

At block 310, the frame analyzer 222 can generate automatic white balance data for each of the received frames. In some embodiments, a dedicated image signal processor or another processor may generate the white balance ("AWB") data instead of or together with the frame analyzer 222. AWB data can be used to adjust a color cast of captured image data, for example due to color temperature characteristics of a source of ambient light illuminating the image scene, to accurately match the colors in the captured image to the colors perceived by a human observer of the image scene. AWB data can include R/G (blue channel normalized by green channel) and/or R/G (red channel normalized by green channel) ratios for a pixel or region of pixels in some embodiments. In some embodiments, as explained in more detail with respect to FIG. 4, each frame can be divided into a number of regions, and AWB statistics can be automatically generated for each region.

At block 315, the frame analyzer 222 and/or a dedicated image signal processor or other processor can generate automatic exposure control ("AEC") data for each of the received frames. AEC data can be used to estimate exposure settings, for instance aperture and shutter speed, based on analysis of a preview frame. AEC data can include a Y (luma) value for a pixel or region of pixels in some embodiments. In some embodiments, as explained in more detail with respect to FIG. 4, each frame can be divided into a number of regions, and AEC statistics can be automatically generated for each region.

At block 320, the frame analyzer 222 can calculate at least one row sum value for each row (or a predetermined subset of rows) of pixels in a current frame and a previous frame for performing a row sum comparison to detect potential flash collisions. Separate AWB and AEC row sums can be calculated in some embodiments, and separate R/G and B/G AWB row sums can be calculated in some embodiments. Row sums can be calculated by summing pixel values (for example R/G, B/G, or Y) of each pixel in a row.

At block 325, the frame analyzer 222 can compute a difference between each of the AWB row sums and AEC row sums for a pair of corresponding rows. As an example, the frame analyzer 222 can compute the AWB row sum difference between the AWB row sum for a first row of the current frame and the AWB row sum for a first row of the previous frame, and can compute the AEC row sum difference between the AEC row sum for a first row of the current frame and the AEC row sum for a first row of the previous frame.

In some embodiments, an AWB row sum difference $AWB_\Delta$ can be calculated using AWB data as defined by Equation (1) below:

$$AWB_\Delta = \Sigma abs | V_{AWB}(t) - V_{AWB}(t-1) | \qquad (1)$$

where $V_{AWB}(t)$ represents an M×2 vector of (R/G, B/G) for an M×N region of pixels in a current frame and $V_{AWB}(t-1)$ represents the vector for a corresponding M×N region of pixels in a previous frame. The R/G and B/G ratio values can be separately used to generate a R/G AWB row sum and a B/G row sum, and the AWB row sum and B/G row sum can be summed or otherwise combined into a single value in some embodiments. In some embodiments, an AEC row sum difference $AEC^\Delta$ can be calculated using AEC data using Equation (2):

$$AEC_\Delta = \Sigma abs | V_{AEC}(t) - V_{AEC}(t-1) | \qquad (2)$$

where $V_{AEC}(t)$ represents a M×2 vector of Y for the M×N region of pixels in the current frame and $V_{ABC}(t-1)$ represents the vector for a corresponding M×N region of pixels in a previous frame.

At decision block 330, the frame analyzer 222 can compare the row sum value (or values) to a threshold (or thresholds). In some embodiments, the AWB row sum difference $AWB_\Delta$ can be compared to a first threshold and the AEC row sum difference $AEC_\Delta$ can be compared to a second threshold. The first and second threshold can be tunable parameters controlling stability criteria for AWB and AEC, respectively, that is, controlling how much quality degradation due to flash collision or other causes is acceptable. In some embodiments, a threshold difference of 4 stops or more of the total row sum value of the row in the previous frame can indicate flash collision. In other embodiments, a difference of 1 stop or even ½ stop can be used as the threshold. As used herein, a "stop" refers to a unit used to quantify ratios of light or exposure, with each added stop meaning a factor of two, and each subtracted stop meaning a factor of one-half. The one-stop unit is also conventionally known as the EV (exposure value) unit. In some embodiments, the thresholds can be adjusted between frame comparisons in order to reflect row sum values of determined over-exposed regions of image frames.

If the AWB row sum difference $AWB_\Delta$ is less than or equal to the first threshold and the AEC row sum difference $AEC_\Delta$ is less than or equal to the second threshold for a row or group of rows, then the current frame is likely stable and no flash collision is present. Accordingly, the process 300A can transition to block 345 and output an indication that no flash influence was detected. The process 300A can end and final image capture can proceed.

If either of the AWB row sum difference $AWB_\Delta$ is greater than the first threshold and the AEC row sum difference $AEC_\Delta$ is greater than the second threshold for a row or group of rows, then the current frame is likely unstable due to a flash collision. For example, a flash collision that matches the color temperature of the ambient lighting conditions in the target image scene could cause a bright band to appear in the captured image due to the flash collision. The AWB row sum difference $AWB_\Delta$ may not be above the threshold due to the matching color temperatures, whereas the AEC row sum difference $AEC_\Delta$ may be above the threshold due to the increase in brightness. Accordingly, the process 300A can transition to block 335 and output a flash collision detected indication. In some embodiments, process 300A can also output an indication of an over-exposed row or set of rows for use in analyzing subsequent frames. For example, the threshold for comparison of row sum data for known over-exposed rows in a current frame to row sum data for corresponding rows in a subsequent frame can be adjusted to more accurately determine whether the flash collision is continuing, or whether the corresponding rows have returned to desired exposure levels.

At block 340, the system 200 can perform a flash collision compensation process based on the indication that flash collision was detected. For example, the system can transition to flash collision compensation process 300B described below in some embodiments. In other embodiments, the flash collision indication can trigger implementation of a flash traffic collision protocol, as discussed below with respect to FIGS. 5-6B.

Figure 3B:
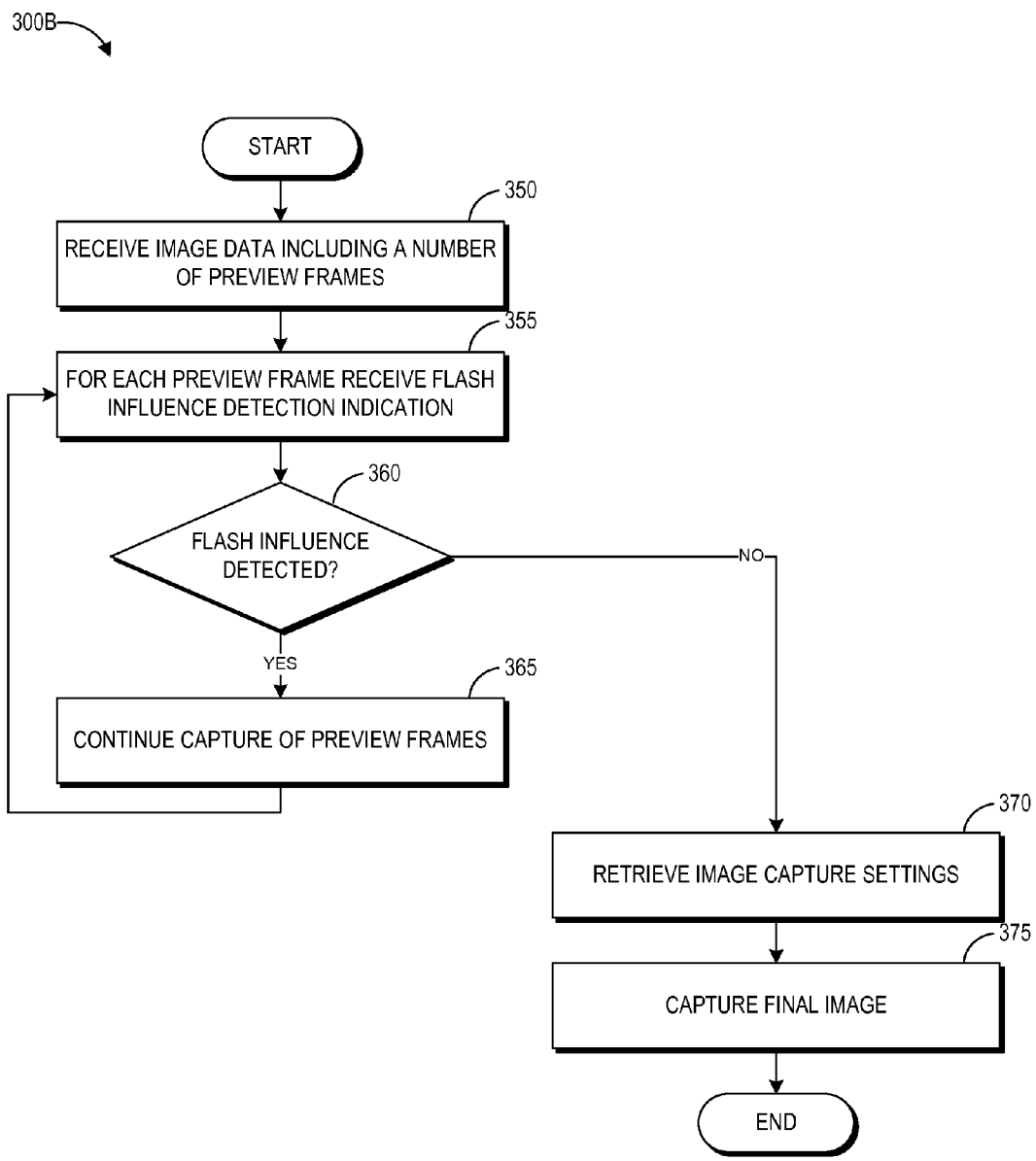
FIG. 3B illustrates a flowchart of an embodiment of a flash collision compensation process.

FIG. 3B illustrates a flowchart of an embodiment of a flash collision compensation process 300B. The process 300A can be implemented by the flash collision detection and compensation system 200 in some embodiments, or by any image capture and/or processing system having flash collision compensation capabilities.

At block 350, the system 200 can receive image data including a number of frames. For example, as discussed above, a number of preview or viewfinder frames can be generated to display a "live" preview of the image data captured by the system 200 to a user. Such frames can be received at a frame analyzer 222 directly from a camera or from storage.

At block 355, the frame analyzer 222 can generate a flash influence detected indication representing whether or not a flash collision is likely present in a currently analyzed preview frame. The flash influence detected indication can be generated according to the flash collision detection process 300A described above in some embodiments. In other embodiments, the flash influence detected indication can be generated in other ways, for instance based on optically detecting a nearby flash, or based on communicating with other nearby cameras over a network, to name a few examples.

At decision block 360, the frame analyzer 222 can analyze the flash influence detected indication to determine whether a flash collision was detected. If a flash collision was detected, the process 300B can transition to block 365 to continue capture and/or analysis of preview frames, looping back to block 355. The process 300B can loop between blocks 360, 365, and 355 until a preview frame is generated with no flash collision, for example based on the control of preview capture timing module 224. This looping of the process 300B in order to compensate for detected flash collision can introduce a slight delay between when a user initiates image capture and when a final image is capture. However, due to the relatively short duration of camera flash compared to human perception and reaction time, the delay is likely to be insignificant and unnoticeable by a user of the camera. For example, sufficient flash durations for typical camera flash modules can be as short as 30 microseconds, or 0.00003 seconds. Flash durations can be even shorter in cameras equipped with specialized flash modules, for example for high-speed photography, lasting 20 microseconds, or 0.00002 seconds, in some scenarios.

If no flash collision was detected, then the process 300B can transition to block 370 to retrieve or generate image capture settings, for example based on an analysis of the current preview frame with no flash collision detected. Image capture settings can include AE settings as well as possibly post-processing settings for converting raw image data into a final image.

At block 375, the system 200 can capture a final image. In some embodiments, final image capture module 230 can configure the camera 210 to capture a final image according to determined settings based on analysis of the preview frame with no detected flash collision.

Figure 4:
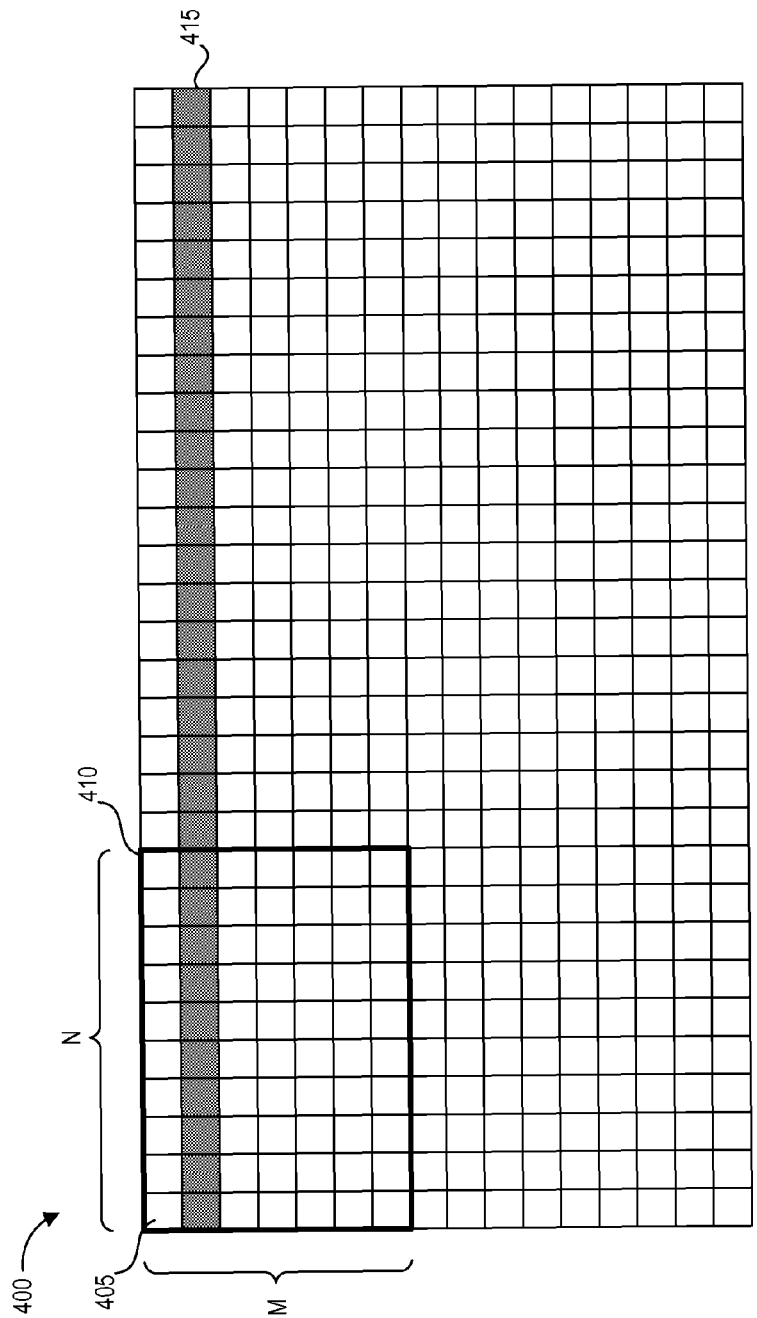
FIG. 4 illustrates an embodiment of pixel configurations that can be used by row sum logic to perform the flash collision detection process of FIG. 3A.

FIG. 4 illustrates an embodiment of a pixel configuration 400 that can be used by row sum logic to perform the flash collision detection process of FIG. 3A. The pixel configuration 400 includes a number of pixels 405 divided into M×N regions 410. AWB and AEC statistics can be provided for each region in each frame during camera preview mode in some embodiments, or for a predetermined representative number of regions in each frame in other embodiments. For each region, AWB statistics can include R/G and B/G values for each pixel in the region, and AEC statistics can include Y values for each pixel in the region. During row summation, row summation logic can use some or all of the R/G, B/G, or Y values of pixels in a row 415 to generate one or more row sum values. The pixel readout architecture for an image sensor in a flash collision detection system can be structured to include row summation logic for generating row sum vales as described above in some embodiments.

Overview of Example Flash Collision Prevention

Figure 5:
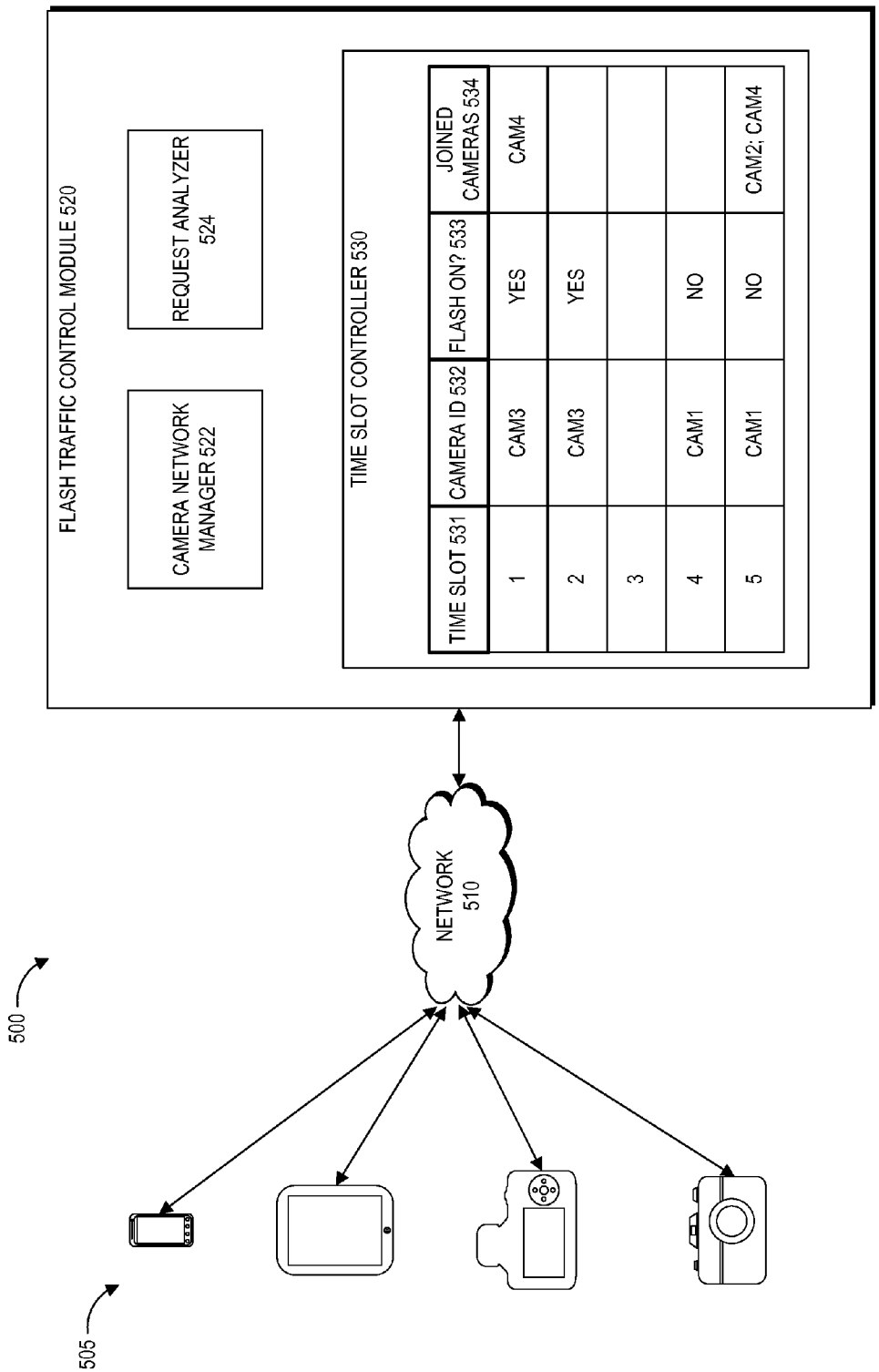
FIG. 5 illustrates a high-level graphical overview and schematic diagram of a flash traffic control system.

FIG. 5 illustrates a high-level graphical overview and schematic diagram of a flash traffic control system 500. The system 500 includes a number of networked user devices 505 including cameras, a network 510, and a flash traffic control module 520.

User devices 505 can be any of a number of devices equipped with image capture capabilities. For example, devices 505 may be mobile communications devices, e.g. smartphones, tablets, or digital cameras in various embodiments. Other computing devices equipped with image capture capabilities can be configured for network connection to a flash traffic control protocol.

The network 510 can be a local area network or a wide area network, e.g. the Internet, or a satellite network, for example a mobile communications network, or another network providing device-to-device communications. Accordingly, the networked cameras can be equipped with suitable means for accessing the network for example WiFi, Bluetooth, 3G, 4G, or other wireless or wired network connection and communication means.

Flash traffic control module 520 can be used to carry out a flash traffic control protocol for organizing or sequencing the use of flash during image capture by the networked user devices 505 (also referred to as "networked cameras") in order to prevent flash collisions among the networked cameras. In some embodiments, flash traffic control module 520 can be one or more remote servers configured for storing and executing instructions to carry out the flash traffic control protocol described herein. Although flash traffic control module 520 is depicted as being a separate module from the user devices 505 accessible over the network, in some embodiments the flash traffic control module 520 can be implemented on one of the networked devices 505. In some embodiments, flash traffic control module 520 can be available as a set of software instructions or applications, and can be provided to a user together with a device or available for download by the user onto the device. In some embodiments, two or more of the networked devices 505 can be equipped with a flash traffic control module 520. Accordingly, communications over the network 510 can be used to designate a lead device to implement the flash traffic control protocol or to synchronize operations of flash traffic control protocols across devices.

As illustrated, the flash traffic control module 520 can include a camera network manager 522, a request analyzer 524, and a time slot controller 530. Together these components can operate to execute the flash traffic control protocol. For example, camera network manager 522 may be configured to assign identification names and/or numbers to cameras joining the network. In some embodiments in which the flash traffic control module 520 is incorporated into a user device 505, camera network manager 522 can be configured to scan a surrounding area and identify other cameras with which to establish the flash traffic control protocol network. The flash traffic control module 520 can be configured to scan the surrounding area upon powering on the device, initiation of image capture, or continuously/intermittently during operation of the device in various embodiments.

The request analyzer 524 can receive incoming image capture requests including flash information from the networked cameras. Flash information can include an indication of whether a camera requesting to perform image capture ("requesting camera") is set to perform image capture using flash, and, if so, the duration of the flash. The flash information can additionally include a number and duration of one or more pre-flashes that the requesting camera is set to use for image capture. The request analyzer can send request data including an identification associated with the requesting camera and flash information to the time slot controller 530.

The time slot controller 530 can use the received request data for assigning a time slot to the requesting camera during which the requesting camera can perform image capture. As illustrated, the time slot controller 530 may store a data repository including data for some or all of a time slot 531, camera ID 532, flash on indication 533, and joined camera IDs 534. A number of different data associations for these fields 531, 532, 533, 534 have been illustrated for purposes of example and not limitation. The time slots assigned and maintained by the time slot controller 530 can be fixed lengths of time in some embodiments, and in other embodiments the duration of the time slots can be dynamically determined, for example based on an image capture timeframe of a camera assigned to each time slot.

For example, the current time slot, time slot 1, is illustrated as being occupied by a camera identified as "CAM3" with flash on, and with "CAM4" joining time slot 1. Because "CAM3" occupies time slot 1 and will use flash for image capture, "CAM4" may be prevented by the flash traffic collision protocol from also using flash in order to not cause a flash collision with the image captured by "CAM3." For example, when "CAM4" requests assignment of a time slot for image capture, the flash traffic control protocol may determine that the current time slot (time slot 1) is occupied by "CAM3" and may determine whether "CAM4" ("the requesting camera") intends to use flash. If not, "CAM4" may be allowed to join the current time slot. In some embodiments, time slot controller 530 can generate instructions to synchronize rolling shutter and exposure settings of "CAM4," the requesting camera, to the other camera already occupying the time slot, "CAM3." Synchronization of the rolling shutter may include providing a common rolling shutter start time to the requesting camera and the other camera in some embodiments. In other embodiments, synchronization of the rolling shutter may include providing a timeframe of the other camera's flash duration to the requesting camera, indicating a timeframe during which the operation of the rolling shutter should be completed. Using the instructions, the requesting camera "CAM4" may capture an image using the flash of the other camera "CAM3" with proper exposure.

Time slot 2 is illustrated as being also occupied by "CAM3" with flash on with no joining cameras. Time slot 3 is illustrated as being unoccupied. Time slot 4 is illustrated as being occupied by "CAM1" with flash off with no joining cameras.

Time slot 5 is illustrated as being occupied by "CAM1" with flash off, and with "CAM2" and "CAM4" joining time slot 5. Because "CAM1" was assigned to "CAM1" with flash off, joining cameras "CAM2" and "CAM4" may be prevented from using flash in order to not cause a flash collision with the image captured by "CAM1."

Because it is possible that there may be other cameras in the proximity not configured with networking capabilities that could use flash without being subject to the flash traffic control protocol, in some embodiments it can be beneficial for user devices 505 to be equipped with the flash collision detection and compensation capabilities described above.

Figure 6A:
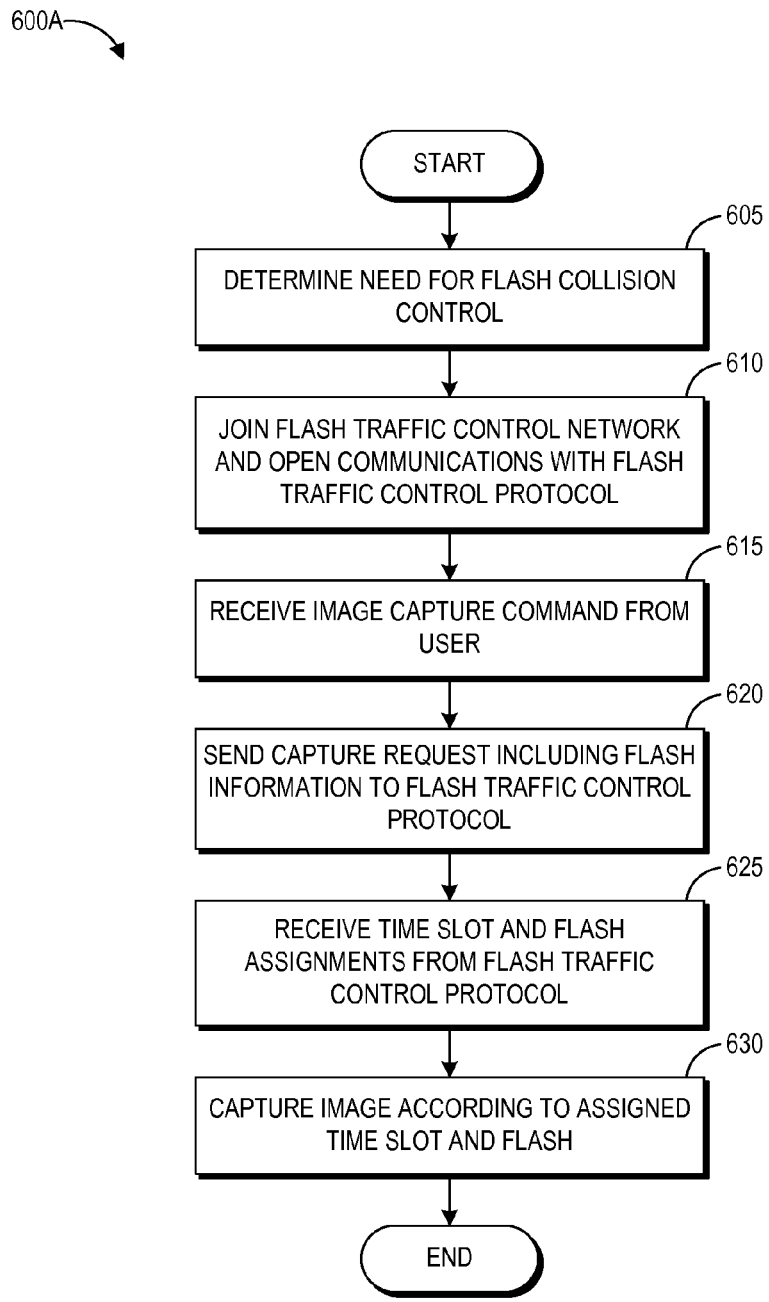
FIG. 6A illustrates a flowchart of an embodiment of a flash traffic control process implemented on a networked camera.

FIG. 6A illustrates a flowchart of an embodiment of a flash traffic control process 600A implemented on a networked camera. The process 600A can be implemented by the flash traffic control system 500 described above in some embodiments, or by any other system having capability to execute a flash traffic control protocol. The process 600A provides one example of a flash traffic control protocol executed from the perspective of a user device including a camera.

At block 605, the user device can determine a need for flash collision traffic control. For example, in some embodiments flash collision detection process 300A can output an indication of flash indication being detected in a preview frame. In other embodiments, flash can be optically detected. In some embodiments, process 600A can be initiated when a network-capable camera detects other network-capable cameras within a predetermined range.

At block 610, the user device can join a flash traffic control network and open communications with a flash traffic control protocol. As described above, in some embodiments the flash traffic control protocol can be remote to the user device, for example on another networked camera or on one or more servers. In some embodiments the user device can be provided with the flash traffic control protocol.

At block 615, the user device receives an image capture command from a user, for example as indicated by depressing a mechanical shutter button or touching a touch-sensitive shutter button zone provided on a touch panel of the device.

At block 620, the user device sends the capture request including flash information to the flash traffic control protocol. The flash information includes an indication of whether the camera of the user device is set to capture the requested image with or without flash, and, if the camera will use flash, the duration of the flash. The flash information can also include a number and duration of pre-flashes that the camera will use during image capture.

At block 625, the user device receives a time slot and flash assignment from the flash traffic control protocol. For instance, the user device may be assigned a current time slot or a subsequent time slot based on previously submitted requests from other networked cameras. The flash assignment can include a restriction on whether flash can be used by the user device and/or a duration of the flash in order to avoid flash collisions with other networked cameras. As described above, in some embodiments the user device can additionally receive instructions to synchronize a rolling shutter of the device with the flash or rolling shutter of another camera assigned to a time slot which the user device is joining in order to take advantage of the flash of the other camera.

At block 630, the user device can capture the final image according to the assigned time slot and flash assignment. Though not illustrated, in some embodiments if the assigned time slot is greater than a predetermined length of time from a current time slot, the user device can proceed with image capture without use of the flash traffic control protocol, for example according to processes 300A and 300B described above. The predetermined length of time can be determined in some embodiments based on a tolerance for user-perceived latency between initiation of image capture and capture of the final image.

Figure 6B:
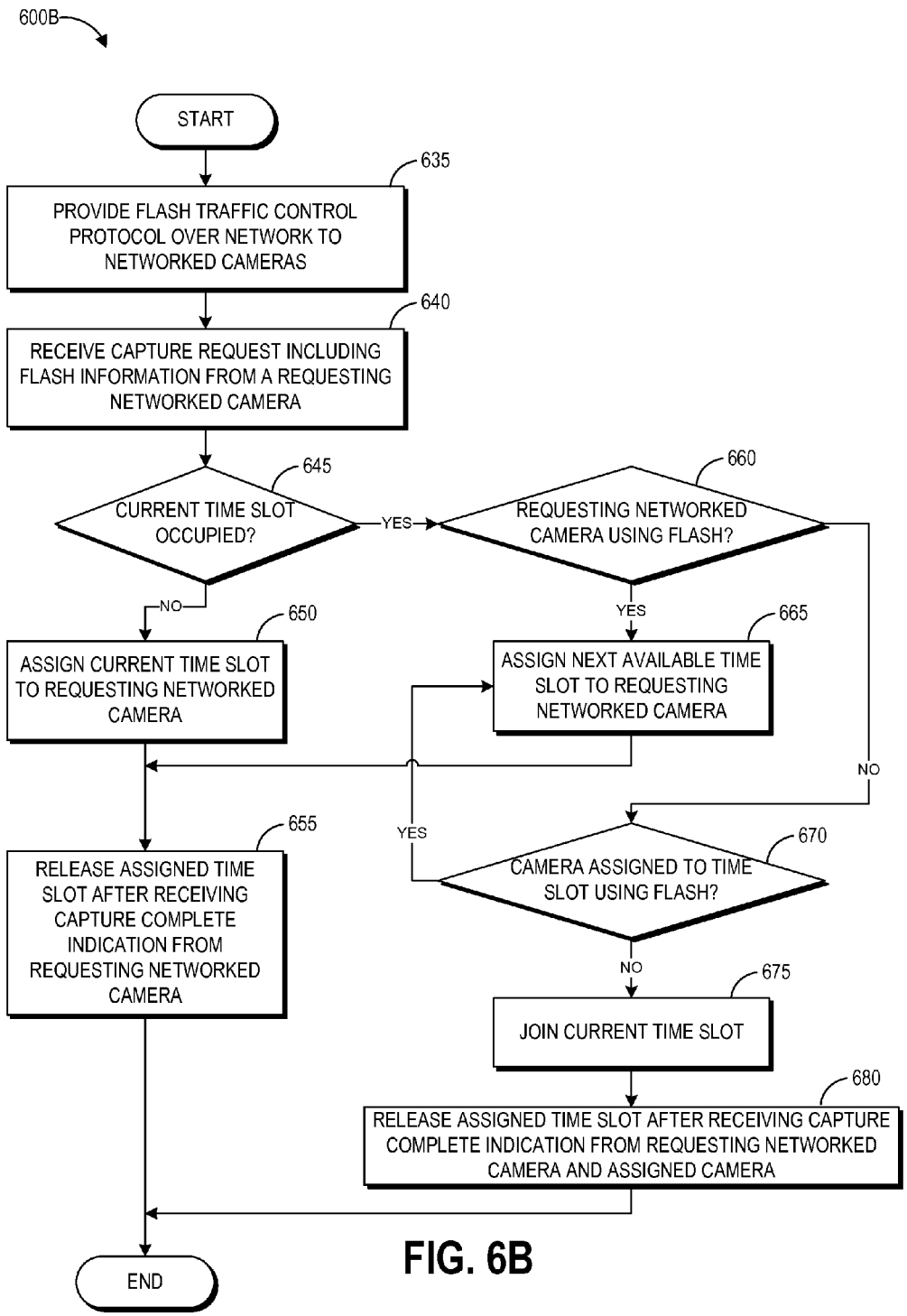
FIG. 6B illustrates a flowchart of an embodiment of a flash traffic control process implemented by a flash traffic control protocol.

FIG. 6B illustrates a flowchart of an embodiment of a flash traffic control process 600B implemented by a flash traffic control protocol. The process 600B can be implemented by the flash traffic control system 500 described above in some embodiments, or by any other system having capability to execute a flash traffic control protocol. The process 600B provides one example of a flash traffic control protocol executed from the perspective of a module executing the flash traffic control protocol.

At block 635, the flash traffic control module can provide the flash traffic control protocol to a number of networked cameras. The cameras may be digital cameras or personal computing devices including image capture technology. In various embodiments, the flash traffic control module can be implemented remotely on one or more servers, on one of the networked cameras, or synchronized across a number of the networked cameras.

At block 640, the flash traffic control module can receive an image capture request from a requesting networked camera. The image capture request can include an indication from the requesting networked camera that the user has initiated image capture as well as flash information.

At decision block 645, the flash traffic control module can determine whether the current time slot is occupied. If the current time slot is not occupied, the process 600B can transition to block 650 at which the flash traffic control module can assign the current time slot to the requesting networked camera. For example, the flash traffic control module can store an ID associated with the requesting networked camera in association with the current time slot, the flash information provided by the requesting networked camera, and any joined cameras also performing image capture using the current time slot according to the requesting networked camera's flash information.

At block 655, the flash traffic control module can release the current time slot. The current time slot can be released in various embodiments after receiving an image capture completion indication from the requesting networked camera, after a predetermined time period elapses (for example an image capture duration provided by the requesting networked camera), or after all joined cameras and the requesting networked camera have completed image capture.

If the current time slot is occupied by another camera, then the process 600B transitions to decision block 660 in which the flash information of the requesting networked camera is analyzed. If the requesting networked camera is set to use flash, then the process 600B transitions to block 665 in which the camera is assigned to the next available time slot. Although not illustrated, in some embodiments the flash traffic control module can also determine whether the other camera occupying the current time slot (or a subsequently occupied time slot) is also using flash and can send instructions to the requesting networked camera to perform image capture using the other camera's flash at the time slot.

If the requesting networked camera is not set to use flash, then the process 600B transitions to decision block 670 in which the flash traffic control module determines whether the other camera assigned to the current time slot is set to use flash. If the other camera is set to use flash, then the process 600B transitions to block 665 in which the camera is assigned to the next available time slot. The flash traffic control module can store an ID associated with the requesting networked camera in association with the next available time slot, the flash information provided by the requesting networked camera, and any joined cameras also performing image capture using the current time slot according to the requesting networked camera's flash information. In some embodiments, the flash traffic control module can assign the requesting networked camera to a next time slot occupied by another camera set to perform image capture without flash.

If the other camera occupying the current time slot is no set to use flash like the requesting networked camera is not set to use flash, then the process 600B transitions to block 675 in which the requesting networked camera is assigned to join the current time slot. In some embodiments the requesting networked camera may be prohibited by the flash traffic control module from changing image capture settings to use flash (or a pre-flash) during the current time slot.

At block 680, the current time slot can be released after the requesting networked camera, the other camera, and any additional joined cameras have concluded image capture.

The time slot assignments discussed above can operate to prevent flash collision among the networked cameras. However, as discussed, in some embodiments networked cameras may deviate from the assignments from the flash traffic control protocol if the assigned time slot is outside of a predetermined timeframe, and in some embodiments additional non-networked cameras can be present. Accordingly, it can be beneficial for the networked cameras to also be equipped with the flash collision detection and compensation techniques described above.

Figure 7:
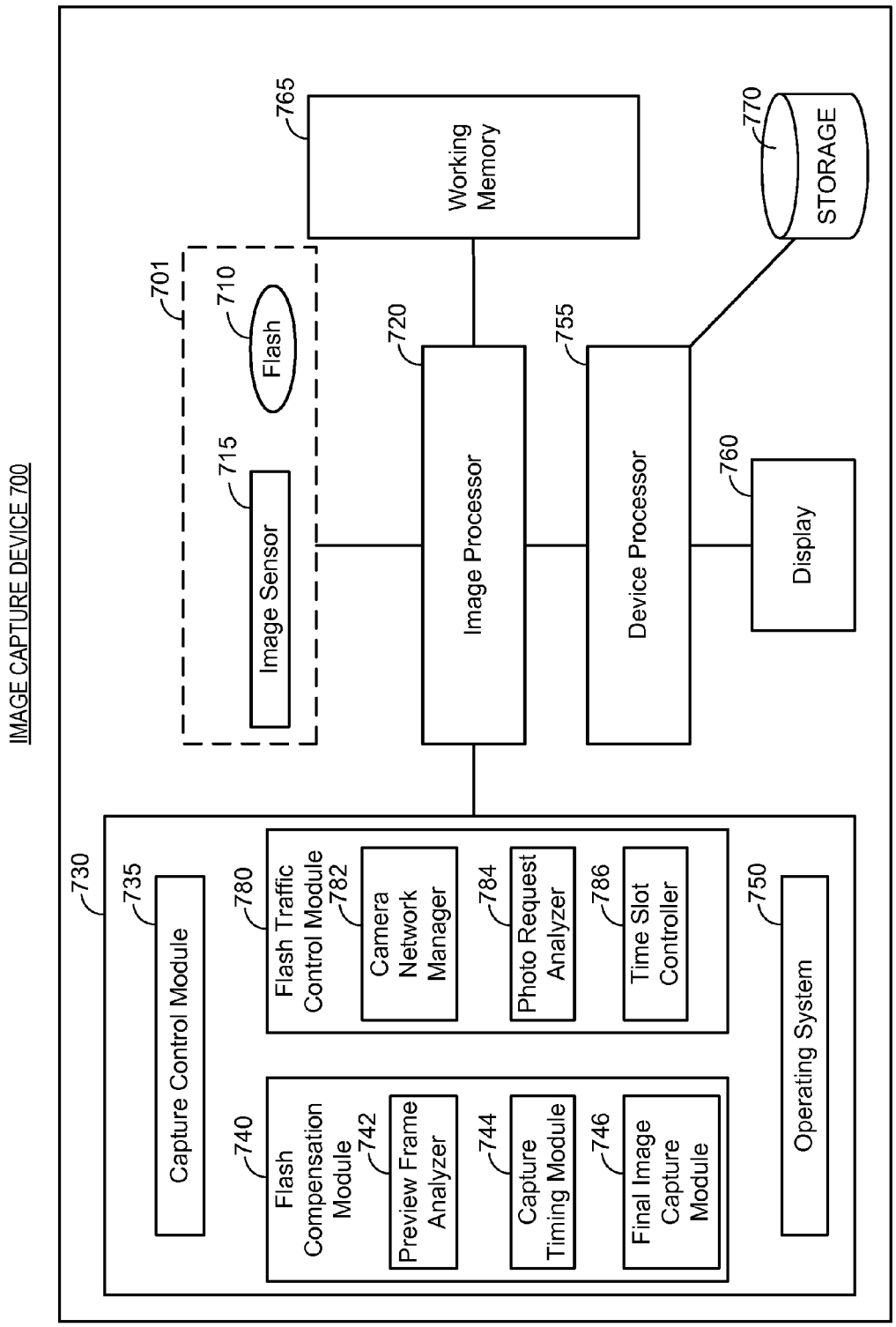
FIG. 7 illustrates a high-level schematic diagram of an embodiment of a device with flash collision compensation and prevention capabilities.

Overview of Example Flash Collision Detection, Compensation, and Prevention Device FIG. 7 illustrates a high-level schematic diagram of an embodiment of a device 700 with flash collision compensation and prevention capabilities, the device 700 having a set of components including an image processor 720 linked to a camera 701. The image processor 720 is also in communication with a working memory 765, memory 730, and device processor 755, which in turn is in communication with storage 770 and an optional electronic display 760.

Device 700 may be a portable personal computing device, e.g. a mobile phone, digital camera, tablet computer, personal digital assistant, or the like. There are many portable computing devices in which using the flash collision detection, compensation, and/or prevention techniques as described herein would provide advantages. Device 700 may also be a stationary computing device or any device in which the flash collision detection, compensation, and/or prevention techniques would be advantageous. A plurality of applications may be available to the user on device 700. These applications may include traditional photographic and video applications as well as flash traffic control protocol applications.

The image capture device 700 includes camera 701 for capturing external images. The camera 701 can include an image sensor 715 and flash module 710 in some embodiments. The camera 701 can be configured for continuous or intermittent capture of preview frames as well as capture of full resolution final images.

The image processor 720 may be configured to perform various processing operations on received preview frames in order to execute flash collision detection, compensation, and/or prevention techniques. Processor 720 may be a general purpose processing unit or a processor specially designed for imaging applications. Examples of image processing operations include AWB and AEC data generation, row summation and comparison, cropping, scaling (e.g., to a different resolution), image stitching, image format conversion, color interpolation, color processing, image filtering (e.g., spatial image filtering), lens artifact or defect correction, etc. Processor 720 may, in some embodiments, comprise a plurality of processors. Processor 720 may be one or more dedicated image signal processors (ISPs) or a software implementation of a processor.

As shown, the image processor 720 is connected to a memory 730 and a working memory 765. In the illustrated embodiment, the memory 730 stores capture control module 735, flash compensation module 740, flash traffic control module 780, and operating system 750. The modules of the memory 730 include instructions that configure the image processor 720 of device processor 755 to perform various image processing and device management tasks. Working memory 765 may be used by image processor 720 to store a working set of processor instructions contained in the modules of memory 730. Alternatively, working memory 255 may also be used by image processor 720 to store dynamic data created during the operation of device 200.

As mentioned above, the image processor 720 is configured by several modules stored in the memories. The capture control module 735 may include instructions that configure the image processor 720 to adjust the focus position of camera 701. Capture control module 735 may further include instructions that control the overall image capture functions of the device 700. For example, capture control module 735 may include instructions that call subroutines to configure the image processor 720 to capture preview image data including one or more frames of a target image scene using the camera 701. In one embodiment, capture control module 735 may then call the flash compensation module 740 or flash traffic control module 780 to eliminate or reduce quality degradations due to flash collision in the captured frames.

The flash compensation module 740 includes sub-modules: preview frame analyzer 742, capture timing module 722, and final image capture module 745. Together, these modules can include instructions that configure the image processor 720 to perform the flash collision detection and compensation techniques discussed above with respect to FIGS. 2-4. In some embodiments, the preview frame analyzer 742, capture timing module 722, and final image capture module 745 can each store instructions that configure to image processor 720 to perform the various tasks described above with respect to preview frame analyzer 222, capture timing module 224, and final image capture module 230.

The flash traffic control module 780 includes sub-modules: camera network manager 782, request analyzer 784, and time slot controller 786. Together, these modules can include instructions that configure the image processor 720 to perform the flash collision prevention or mitigation techniques discussed above with respect to FIGS. 5-6B. In some embodiments, the camera network manager 782, request analyzer 784, and time slot controller 786 can each store instructions that configure to image processor 720 to perform the various tasks described above with respect to camera network manager 522, request analyzer 524, and time slot controller 530.

Operating system module 750 configures the image processor 720 to manage the working memory 765 and the processing resources of device 700. For example, operating system module 750 may include device drivers to manage hardware resources for example the camera 701. Therefore, in some embodiments, instructions contained in the image processing modules discussed above may not interact with these hardware resources directly, but instead interact through standard subroutines or APIs located in operating system component 750. Instructions within operating system 750 may then interact directly with these hardware components. Operating system module 750 may further configure the image processor 720 to share information with device processor 755.

Device processor 755 may be configured to control the display 760 to display the captured image, or a preview of the captured image, to a user. The display 760 may be external to the imaging device 200 or may be part of the imaging device 200. The display 760 may also be configured to provide a view finder displaying a preview image for a use prior to capturing an image, for example present the user with a visual representation of the flash collision. The display 760 may comprise an LCD or LED screen, and may implement touch sensitive technologies.

Device processor 755 may write data to storage module 770, for example data representing captured images and row sum values and comparisons. While storage module 770 is represented graphically as a traditional disk device, those with skill in the art would understand that the storage module 770 may be configured as any storage media device. For example, the storage module 770 may include a disk drive, e.g. a floppy disk drive, hard disk drive, optical disk drive or magneto-optical disk drive, or a solid state memory e.g. a FLASH memory, RAM, ROM, and/or EEPROM. The storage module 770 can also include multiple memory units, and any one of the memory units may be configured to be within the image capture device 700, or may be external to the image capture device 700. For example, the storage module 770 may include a ROM memory containing system program instructions stored within the image capture device 700. The storage module 770 may also include memory cards or high speed memories configured to store captured images which may be removable from the camera. The storage module 770 can also be external to device 700, and in one example device 700 may wirelessly transmit data to the storage module 770, for example over a network connection.

Although FIG. 7 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components, for example to save cost and/or to improve performance.

Additionally, although FIG. 7 illustrates two memory components, including memory component 720 comprising several modules and a separate memory 765 comprising a working memory, one with skill in the art would recognize several embodiments utilizing different memory architectures. For example, a design may utilize ROM or static RAM memory for the storage of processor instructions implementing the modules contained in memory 730. The processor instructions may be loaded into RAM to facilitate execution by the image processor 720. For example, working memory 765 may comprise RAM memory, with instructions loaded into working memory 765 before execution by the processor 720.

Implementing Systems and Terminology

Implementations disclosed herein provide systems, methods and apparatus for flash collision detection, compensation, and prevention. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, one or more image signal processors, a memory including instructions or modules for carrying out the flash collision detection, compensation, and prevention processes discussed above. The device may also have data, a processor loading instructions and/or data from memory, one or more communication interfaces, one or more input devices, one or more output devices for example a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (for example, a device executing a flash traffic control protocol). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards for example the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a web site, server, or other remote source using a coaxial cable, fiber optic cable, twisted pair, digital subscriber line (DSL), or wireless technologies for example infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system for flash collision detection and compensation, the system comprising:
    an image sensor configured to capture a plurality of preview frames depicting an image scene and a final image depicting the image scene, each of the plurality of preview frames including a plurality of pixels arranged in a plurality of rows: and
    a frame analyzer processor configured to:
        for a first row of the plurality of rows in a current frame of the plurality of preview frames, calculate a first row sum value by summing a value of each of the plurality of pixels in the first row,
        for a second row of the plurality of rows in a previous frame of the plurality of preview frames, calculate a second row sum value by summing a value of each of the plurality of pixels in the second row, the first row and the second row depicting a substantially similar portion of the image scene,
        calculate a row sum difference based at least partly on subtracting one of the first row sum value and the second row sum value from the other of the first row sum value and the second row sum value,
    output one of a flash collision detected indication or a flash collision not detected indication based at least partly on the row sum difference,
        in response to the flash collision detected indication, generate instructions to continue capture, by the image sensor, of at least one additional preview frame depicting the image scene, and
        in response to the flash collision not detected indication, generate instructions to capture, by the image sensor, the final image of the image scene.

2. The system of claim 1, wherein the instructions generated in response to the flash collision not detected indication configure the image sensor to capture a full resolution as the final image.

3. The system of claim 2, wherein the frame analyzer processor is further configured to determine capture settings for the full resolution final image based at least partly on an analysis of the current frame.

4. The system of claim 3, wherein the analysis of the current frame includes analysis of one or both of white balance statistics and exposure control statistics generated based at least partly on values of the plurality of pixels of the current frame.

5. The system of claim 1, the frame analyzer processor is configured to: generate current frame white balance statistics and current frame exposure control statistics based at least partly on values of the plurality of pixels of the current frame; and generate previous frame white balance statistics and previous frame exposure control statistics based at least partly on values of the plurality of pixels of the previous frame.

6. The system of claim 5, wherein the first row sum value is based at least partly on the current frame white balance statistics and wherein the second row sum value is based at least partly on the previous frame white balance statistics.

7. The system of claim 5, wherein the first row sum value is based at least partly on the current frame exposure control statistics and wherein the second row sum value is based at least partly on the previous frame exposure control statistics.

8. The system of claim 1, further comprising a digital camera, mobile communication device, or portable personal computing device including the image sensor.

9. A method for flash collision detection and compensation, the method comprising:
    receiving a plurality of preview frames depicting an image scene, each of the plurality of preview frames including a plurality of pixels arranged in a plurality of rows;
    for a first row of the plurality of rows in a current frame of the plurality of preview frames, calculating a first row sum value by summing a value of each of the plurality of pixels in the first row;
    for a second row of the plurality of rows in a previous frame of the plurality of preview frames, calculating a second row sum value by summing a value of each of the plurality of pixels in the second row, the first row and the second row depicting a substantially similar portion of the image scene;
    calculating a row sum difference based at least partly on subtracting one of the first row sum value and the second row sum value from the other of the first row sum value and the second row sum value;
    outputting one of a flash collision detected indication or a flash collision not detected indication based at least partly on the row sum difference;
    in response to the flash collision detected indication, generating instructions to continue capture, by an image sensor, of at least one additional preview frame depicting the image scene; and
    in response to the flash collision not detected indication, generating instructions to capture, by the image sensor, a final image of the image scene.

10. The method of claim 9, further comprising generating instructions that configure the image sensor to continue capturing additional image frames until output of the flash collision not detected indication.

11. The method of claim 9, further comprising, in response to the flash collision not detected indication, generating instructions that configure the image sensor to capture a full resolution final image.

12. The method of claim 9, further comprising:
    comparing the row sum difference to a threshold; and
    determining whether to output the flash collision detected indication or the flash collision not detected indication based at least partly on a result of comparing the row sum difference to the threshold.

13. The method of claim 9, further comprising:
    accessing one or both of current frame white balance statistics and current frame exposure control statistics based at least partly on values of the plurality of pixels of the current frame; and
    accessing one or both of previous frame white balance statistics and previous frame exposure control statistics based at least partly on values of the plurality of pixels of the previous frame.

14. The method of claim 13, wherein calculating the first row sum value comprises:

calculating a first row white balance sum value based at least partly on the current frame white balance statistics; and calculating a first row exposure control sum value based at least partly on the current frame exposure control statistics.

15. The method of claim 14, wherein calculating the second row sum value comprises:

calculating a second row white balance sum value based at least partly on the previous frame white balance statistics; and calculating a second row exposure control sum value based at least partly on the previous frame exposure control statistics.

16. The method of claim 15, wherein calculating the row sum difference comprises:

calculating a white balance row sum difference based at least partly on the first row white balance sum value and the second row white balance sum value; and calculating an exposure control row sum difference based at least partly on the first row exposure control sum value and the second row exposure control sum value.

17. The method of claim 16, further comprising:

comparing the white balance row sum difference to a first threshold and comparing the exposure control row sum difference to a second threshold; and determining whether to output the flash collision detected indication or the flash collision not detected indication based at least partly on a result of comparing the white balance row sum difference to the first threshold and based at least partly on a result of comparing the exposure control row sum difference to the second threshold.

18. A non-transitory computer-readable medium storing instructions that, when executed, configure at least one processor to perform operations comprising:

receiving a plurality of preview frames depicting an image scene, each of the plurality of preview frames including a plurality of pixels arranged in a plurality of rows;

for a first row of the plurality of rows in a current frame of the plurality of preview frames, calculating a first row sum value by summing a value of at least some of the plurality of pixels in the first row;

for a second row of the plurality of rows in a previous frame of the plurality of preview frames, calculating a second row sum value by summing a value of at least some of the plurality of pixels in the second row, the first row and the second row depicting a substantially similar portion of the image scene and forming a pair of corresponding rows;

calculating a row sum difference based at least partly on subtracting one of the first row sum value and the second row sum value from the other of the first row sum value and the second row sum value;

outputting one of a flash collision detected indication or a flash collision not detected indication based at least partly on the row sum difference;

in response to the flash collision detected indication, generating instructions to continue capture, by an image sensor, of at least one additional preview frame depicting the image scene; and in response to the flash collision not detected indication, generating instructions to capture, by the image sensor, a final image of the image scene.

19. The non-transitory computer-readable medium of claim 18, the operations further comprising calculating a plurality of row sum differences, each corresponding to one of a plurality of pairs of corresponding rows in the current frame and the previous frame.

20. The non-transitory computer-readable medium of claim 19, the operations further comprising determining a properly exposed region of the current frame and an over-exposed region of the current frame based at least partly on the plurality of row sum differences.

21. The non-transitory computer-readable medium of claim 20, the operations further comprising determining to output the flash collision detected indication based at least partly on the over-exposed region of the current frame.

22. The non-transitory computer-readable medium of claim 20, the operations further comprising calculating a plurality of subsequent frame row sum differences, each corresponding to one of a plurality of pairs of corresponding rows in the current frame and a subsequent frame.

23. The non-transitory computer-readable medium of claim 22, further comprising:

comparing a first portion of the plurality of subsequent frame row sum differences to a first threshold, the first portion corresponding to rows in the properly exposed region of the current frame;

calculating a second threshold by adjusting the first threshold to compensate for row sum values in the over-exposed region of the current frame;

comparing a second portion of the plurality of subsequent frame row sum differences to the second threshold, the second portion corresponding to rows in the over-exposed region of the current frame; and determining whether to output the flash collision detected indication or the flash collision not detected indication based at least partly on a result of comparing the first portion of the plurality of subsequent frame row sum differences to the first threshold and based at least partly on a result of comparing the second portion of the plurality of subsequent frame row sum differences to the second threshold.

24. A flash collision detection and compensation apparatus comprising:

means for capturing a plurality of preview frames and a final image;

means for receiving the plurality of preview frames depicting an image scene, the plurality of preview frames including a plurality of pixels arranged in a plurality of rows;

means for calculating a row sum difference based at least partly on subtracting a first row sum value of a first row of a first of the plurality of previous frames from a second row sum value of a second row of a second of the plurality of previous frames;

means for determining whether a flash collision has occurred in any of the plurality of image frames based at least partly on the row sum difference;

means for generating instructions to continue capture, by the means for capturing, of at least one additional preview frame depicting the image scene based on a determination that the flash collision has occurred; and means for generating instructions to capture, by the means for capturing, the final image based on a determination that the flash collision has not occurred.

25. The flash collision detection and compensation apparatus of claim 24, further comprising means for performing a plurality of row sum calculations and comparisons based on pixel values in the plurality of preview frames.

26. The flash collision detection and compensation apparatus of claim 24, further comprising means for generating exposure settings for capture of the final image.

27. The flash collision detection and compensation apparatus of claim 24, further comprising means for generating white balance statistics and exposure control statistics for each of the plurality of preview frames.

* * * * *